United States Patent
McKenna et al.

(10) Patent No.: US 9,558,554 B1
(45) Date of Patent: Jan. 31, 2017

(54) DEFINING BASIS FUNCTION REQUIREMENTS FOR IMAGE RECONSTRUCTION

(71) Applicant: International Business Machines Corporation, Armonk, NY (US)

(72) Inventors: Sean A. McKenna, Blanchardstown (IE); Fearghal O'Donncha, Galway (IE); Emanuele Ragnoli, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/976,114

(22) Filed: Dec. 21, 2015

(51) Int. Cl.
| | |
|---|---|
| G06K 9/00 | (2006.01) |
| G06T 7/00 | (2006.01) |
| G06T 11/00 | (2006.01) |
| G06T 5/00 | (2006.01) |
| H04N 19/426 | (2014.01) |
| H04N 19/182 | (2014.01) |

(52) U.S. Cl.
CPC ............. G06T 7/003 (2013.01); G06T 5/002 (2013.01); G06T 7/0028 (2013.01); G06T 11/003 (2013.01); H04N 19/182 (2014.11); H04N 19/426 (2014.11); G06T 2200/28 (2013.01); G06T 2207/20076 (2013.01); G06T 2207/20148 (2013.01); G06T 2207/20182 (2013.01); G06T 2207/20224 (2013.01)

(58) Field of Classification Search
CPC ..... H04N 19/182; H04N 19/426; G06T 7/003; G06T 7/0028; G06T 5/002; G06T 11/003; G06T 2207/20182; G06T 2207/20224; G06T 2207/20148; G06T 2207/20076; G06T 2200/28
See application file for complete search history.

(56) References Cited

U.S. PATENT DOCUMENTS

| | | | | |
|---|---|---|---|---|
| 5,666,212 | A * | 9/1997 | Gilge | H04N 19/196 358/426.12 |
| 6,014,466 | A * | 1/2000 | Xia | G06T 9/007 375/240 |

(Continued)

*Primary Examiner* — Aaron W Carter
(74) *Attorney, Agent, or Firm* — Scully, Scott, Murphy & Presser, P.C.; Kurt P. Goudy, Esq.

(57) ABSTRACT

A system, method and computer program product for determining an accuracy of a reconstructed image relative to a reference image. The method includes decomposing a reference image into a plurality of basis functions; reconstructing the image using the plurality of basis functions; determining differences between the reference image and reconstructed image; using statistical parametric mapping (SPM) to quantify existence of statistically significant regions of excursion in the determined differences; determining, based on the quantified regions of excursion, a minimum number of basis functions to reconstruct the image; and storing the determined number. The difference image is used as input to a univariate statistical test at every pixel to calculate an image of the test statistic which is then modeled as a multiGaussian random field. Quantities are calculated from the test statistic image for comparison to expected values to determine if the reconstructed image is an accurate representation of the reference image, or whether the number of basis functions used in the reconstruction is to be increased.

21 Claims, 9 Drawing Sheets

(56) References Cited

U.S. PATENT DOCUMENTS

| | | | | |
|---|---|---|---|---|
| 6,115,423 A | * | 9/2000 | Shen | H04N 5/66 |
| | | | | 345/204 |
| 8,380,469 B2 | | 2/2013 | Vija et al. | |
| 2004/0092809 A1 | * | 5/2004 | DeCharms | G01R 33/4806 |
| | | | | 600/410 |
| 2010/0007804 A1 | * | 1/2010 | Guncer | G09G 3/3426 |
| | | | | 348/790 |
| 2010/0225679 A1 | * | 9/2010 | Guncer | G09G 3/2022 |
| | | | | 345/690 |
| 2011/0160543 A1 | * | 6/2011 | Parsey | A61B 5/055 |
| | | | | 600/300 |
| 2011/0299050 A1 | * | 12/2011 | Mos | G03F 7/70625 |
| | | | | 355/27 |
| 2014/0180060 A1 | * | 6/2014 | Parrish | G01R 33/4806 |
| | | | | 600/411 |
| 2015/0078507 A1 | | 3/2015 | Kyriakou | |

\* cited by examiner

DEFINING BASIS FUNCTION REQUIREMENTS FOR IMAGE RECONSTRUCTION

FIELD

The present disclosure relates generally to systems and methods for dataset decomposition and reconstruction, e.g., of images. More particularly, the present disclosure relates to analytics and more particularly application of techniques for combining image reconstruction from orthogonal basis functions and (statistical-based) parametric mapping (SPM) techniques for optimal reconstruction of a dataset from a reference dataset.

BACKGROUND

Complex images can be transformed into a more compact representation by mapping of the image using orthogonal basis functions. As an example, principal component analysis (PCA) is a mathematical procedure that transforms a number of, possibly, correlated variables into a (smaller) number of uncorrelated variables (i.e., independent, orthogonal, variables) called principal components. The first principal component accounts for as much of the variability in the data as possible, and each succeeding component accounts for as much of the remaining variability as possible. A principal component analysis can be considered as a rotation of the axes of the original variable coordinate system to new orthogonalaxes, called principal axes, such that the new axes coincide with directions of maximum variation of the original observations.

Image decomposition using orthogonal basis functions has many practical applications including image reconstruction, signal de-noising, blind source separation and data compression.

The question remains as to how many principal components (basis functions) need to be retained for accurate image reconstruction. A critical component is the appropriate choice of cutoff number N that provides the desired dimensional reduction without loss of relevant data. Many methods, both heuristic and statistically based have been proposed to determine the choice of cutoff number N.

Representative methods include: the broken-stick model, the Kaiser-Guttman test, Log-Eigenvalue diagram, cumulative percentage of total variance, Velicer's partial correlation procedure, Cattell's scree test, cross-validation, bootstrapping techniques, and Bartlett's test for equality of eigenvalues. Most of the aforementioned techniques suffer from an inherent subjectivity and Jolliffe, (2005) observes that "attempts to construct rules having more sound statistical foundations seem, at present, to offer little advantage over simpler rules in most circumstances".

Additionally, many of these techniques provide a single measure of the accuracy of the image reconstruction, but do not provide information on the spatial structure of the reconstruction errors.

SUMMARY

In accordance with a first aspect disclosed herein, there is provided a system, method and computer program product for using spatial statistical techniques to develop quantitative measures of image accuracy that allow for determining significant deviations between a reference image and a reconstructed image as well as provide localized information on the differences between the images.

In one aspect, there is provided a computer-implemented method for determining an accuracy of a reconstructed dataset relative to a reference dataset. The method comprises: decomposing, by a processor device, a reference dataset into a plurality of orthogonal basis functions; reconstructing a dataset using as subset of the plurality of orthogonal basis functions; determining differences between the reference dataset and reconstructed dataset; using statistical parametric mapping (SPM) to quantify, at the processor device, existence of statistically significant regions of excursion in the determined differences between the reference dataset and reconstructed dataset; determining, based on the quantified statistically significant regions of excursion, a minimum number of orthogonal basis functions to reconstruct the dataset with a specified degree of accuracy; and storing the minimum number of orthogonal basis functions as representative of the reference dataset.

A computer system for determining an accuracy of a reconstructed dataset relative to a reference dataset. The system comprises: a memory storage device for storing datasets; a processor device in communication with the memory storage device, the processor device configured to: decompose a reference dataset into a plurality of orthogonal basis functions; reconstruct a dataset using a subset of the plurality of orthogonal basis functions; determine differences between the reference dataset and reconstructed dataset; use statistical parametric mapping (SPM) to quantify existence of statistically significant regions of excursion in the determined differences between the reference dataset and reconstructed dataset; determine, based on the quantified statistically significant regions of excursion, a minimum number of orthogonal basis functions to reconstruct the dataset with a specified degree of accuracy; and store, in the memory storage device, the minimum number of orthogonal basis functions as representative of the reference dataset.

In a further aspect, there is provided a computer program product for performing operations. The computer program product includes a storage medium readable by a processing circuit and storing instructions run by the processing circuit for running a method. The method is the same as listed above.

DETAILED DESCRIPTION

There is provided a method and system that enables a quantifiable means of determining the accuracy of an image or dataset or dataset as reconstructed through basis functions image relative to a reference image.

In one aspect, the system and method obtains differences between images that are used to determine the minimal necessary number of basis functions to accurately reconstruct the image. The system and method simplement statistical parametric mapping (SPM) techniques to quantify existence of statistically significant regions of excursion in the difference image (i.e., reconstructed image–reference image).

The system provides a user interface through which a user could interact, for example, to define the criteria for determining the quality of the image reconstruction.

The system and method decomposes basis function of an image to result in a solution space and a null space comprised of the basis functions needed to adequately reconstruct the image (solution) and those that represent unimportant details and noise (null).

The system and method generates an ensemble of reconstructed images from a decomposition of a reference image using a limited number of basis functions and random sampling of the null space.

The system and method apply a local univariate statistical test (e.g. t-test) to the difference between the mean ensemble image and the reference image at each pixel.

The test statistics taken together define a Statistical Parametric Map (SPM), and can be modeled as a multiGaussian random field. Pixel values in an SPM are, under the null hypothesis, distributed according to the properties of a multiGaussian field.

Creation of the SPM allows the image reconstruction quality to be cast as a hypothesis test, a maximum test statistic value, a number of regions of excursion, and a size of the regions of excursion as measured and compared against calculated values.

These calculated values are used to determine whether the reconstructed image is accurate by looking for statistically significant differences from the reference image.

Figure 1:
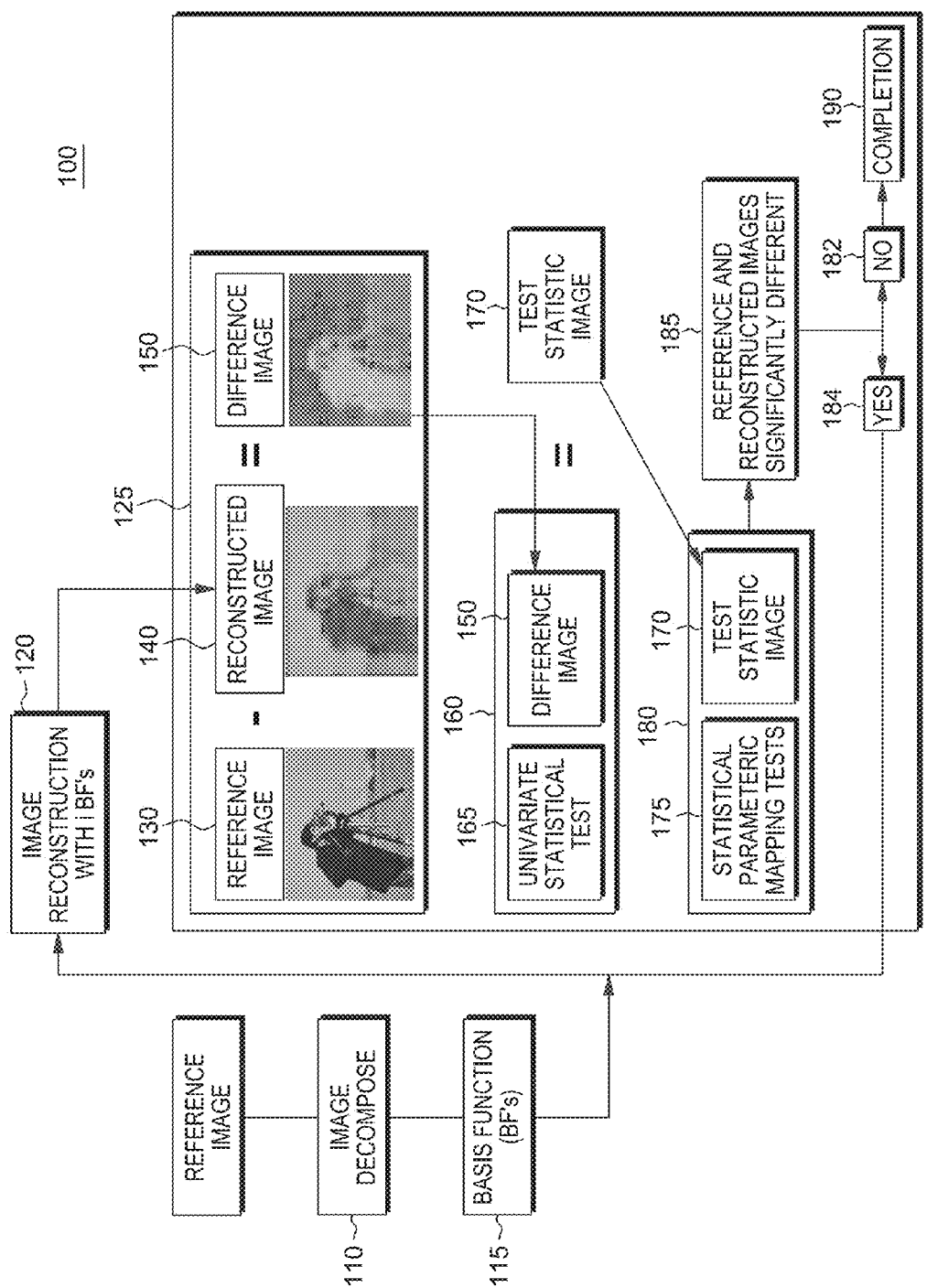
FIG. 1 depicts a flow chart of a computer-implemented method for accurate image reconstruction using a minimum of basis functions according to one embodiment.
Figure 2:
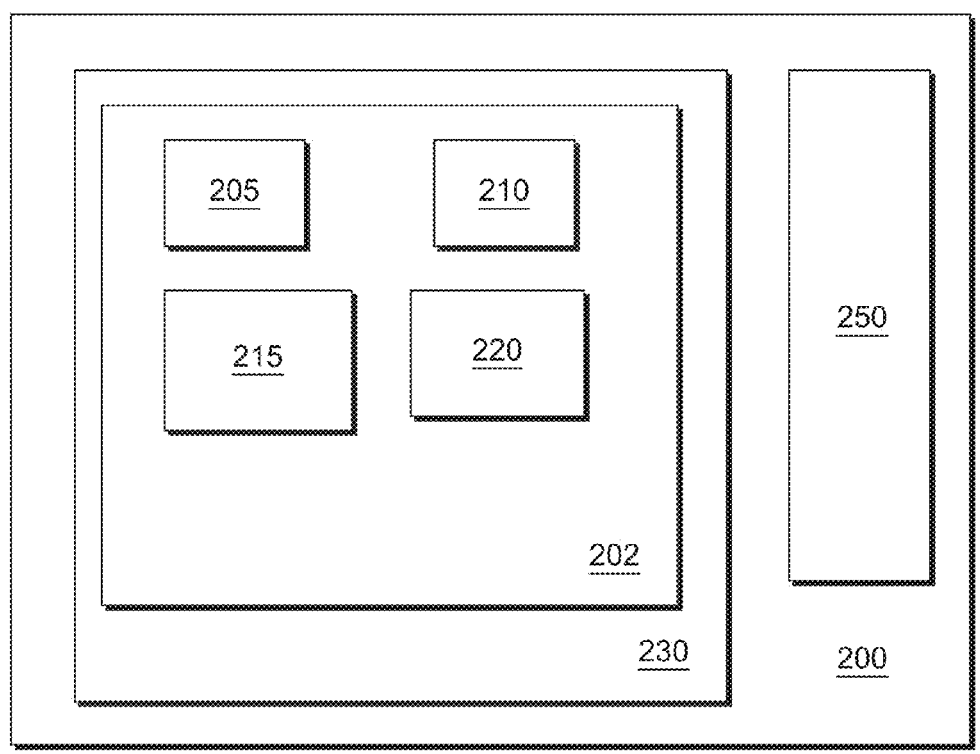
FIG. 2 shows one embodiment of a system including a processing device that runs a software program for performing at least some of the method steps of flow chart of FIG. 1.

FIG. 1 depicts a flow chart of a computer-implemented method 100 for accurate image reconstruction using a minimum of basis functions. FIG. 2 shows one embodiment of a system 200 including a processing device 250 that runs software program 202 stored in a tangible computer readable media, e.g., a memory storage device 230, for performing at least some of the method steps of flow chart 100. The system 200 is a computing system processor that may be encompassed by computing devices, e.g., desktops, laptops, servers, mobile devices, that may accessible via networked and/or cloud communications infrastructure, e.g., via a LAN, WAN, wireless and/or wired public or private communications network, e.g., via internet or virtual private network.

The method 100 and associated software 205 will now be discussed with extensive reference to FIG. 1 (for the method step blocks) and FIG. 2 (for the software blocks).

In the method 100 of FIG. 1, processing begins at step 105 where an image decomposition module ("mod") 205 receives a digital image to be decomposed into basis functions. Data of the input digital image may be formatted according to currently known digital image formats, e.g., TIFF, PNG, GIF, or JPG (please verify and/or indicate any other image file formats, e.g., a raster type image).

Processing proceeds to step 110 where the image decomposition module ("mod") 205 runs a known image decomposition algorithm applied to the image pixels of the input digital image for decomposing the image into a family of orthogonal basis functions which are obtained at 115, FIG. 1. It is understood that any technique that maps an original reference image into a new space where the information in the original image is captured by a series of basis functions within that transformed space may be used, including, but not limited to: Discrete Cosine Transform, Principal Component Analysis, Karhunen-Loeve decomposition, Discrete Wavelet Transform, etc. which approaches all represent the original image using less storage space and in such a way that a facsimile of the original image can be reconstructed.

In one embodiment, when the reference image is decomposed into a set of basis functions, one goal is to contain as much information in as few basis functions as possible. The processing techniques of method 100 provides an objective means of determining the number of basis functions necessary to reconstruct the image to some specified degree of accuracy. The set of basis functions that can achieve this reconstruction to the necessary accuracy are known as the "solution space"; those basis functions where inclusion is not necessary to achieve this level of reconstruction are the "null space" with those basis functions representing unimportant details and noise (null).

Processing proceeds to step 120, FIG. 1 where method steps are run in an image reconstruction module 210 of FIG. 2, to reconstruct the image using an amount "i" of the basis functions obtained. Reconstruction module 210 further runs a method to obtain a difference image between the reconstructed image and the original or reference image for use in determining a minimal necessary number of basis functions to accurately reconstruct the original image, e.g., to a degree of accuracy specified by a user. As shown at 125 the system generates a difference image 150 on a pixel-by-pixel basis by subtracting the reconstructed image 140 from the original reference image 130.

In one embodiment, the development of the statistical test to build the SPM includes testing of an ensemble of images reconstructed from the solution space and some sampling of the null space against the original image. That is, if only one image reconstructed from the solution space is processed, there are no statistics, i.e., just a single reconstruction with no exploration of the necessary number of basis functions to include. By comparing an ensemble of reconstructed images that include the solution space and a random sampling of the null space, there is built the statistics necessary for calculation of the SPM. Thus, this technique includes additionally exploring basis functions in the null space to see if the threshold between solution and null space needs to be changed (i.e., additional basis functions need to be taken from the null space and added to the solution space).

Thus, the system and method at 120 generates an ensemble, i.e., a plurality of reconstructed images, from a decomposition of a reference image using a limited number of basis functions and using a random sampling of the functions from the null space for each reconstructed image of the ensemble.

From the ensemble of reconstructed images, reconstruction module 210 may further generate at 120, a mean ensemble image 140, representing a statistical average of the reconstructed images.

In one embodiment, for each reconstructed image of the ensemble, the system and methods implement statistical parametric mapping (SPM) techniques to quantify existence of statistically significant regions of excursion in each respective difference image 150.

Processing thus proceeds to create the SPM by subtracting a mean reconstructed image 140 (i.e., a mean image over ensemble of images created using solution space and null space) from the original reference image to generate the difference image 150.

Step 160, FIG. 1 runs method steps in a statistical test module 215 of FIG. 2 to apply a statistical test 165 to the difference image 150. In one embodiment, statistical test module 215 applies a local univariate statistical test (e.g., a t-test) to the difference between the mean ensemble image and the reference image at each pixel. The application of a local univariate statistical test (e.g., a t-test) 160 to the difference image 150 results in generating a Test Statistic Image 170. It is understood that statistical test 165 may be any univariate statistical test including t-test, F-test, correlation coefficient, etc.

In one embodiment, the univariate statistical test is applied at every pixel of the image to produce an image of test statistic values (e.g., for t-test, at every pixel, subtract the reference image from the mean reconstructed image (or vice versa), divide by a quantity (sigma/sqrt(n)) where "sigma" is the standard deviation of the image values across the ensemble of reconstructed images at that pixel and "n" is the number of reconstructed images. This is performed for every pixel and the resulting image of "t" values is the Test Statistic Image 170.

Processing then proceeds to step 180, FIG. 1 where method steps are run in a statistical parametric mapping module 220 of FIG. 2 to apply tools 175 specifically for test-statistic maps to quantify the quality of the reconstructed image. Alternatively, the t-values may be converted to Gaussian values and tools developed for multi-Gaussian fields may be applied. In either case, the test-statistic map is considered a realization of a random field and tools developed for t-distributed or Gaussian random fields are applied as statistical parametric mapping tests 175. That is, the test statistics taken together define a Statistical Parametric Map (SPM), and can be modeled as a multiGaussian random field. Pixel values in an SPM are, under the null hypothesis, distributed according to a known probability density function.

As described in greater detail herein below, the step 180 addresses questions such as what is the chance of seeing N distinct regions where the SPM exceeds some value, or what is the chance of having a region of Y pixels above a given threshold.

That is, in one embodiment, creation of the SPM allows the image reconstruction quality to be cast as a hypothesis test, a maximum test statistic value, a number of regions of excursion, and a size of the regions of excursion as measured and compared against calculated values. These calculated values are used to determine whether the reconstructed image is accurate by looking for statistically significant differences from the reference image.

Thus, with reference to method 100 of FIG. 1, the process proceeds to 185 where the statistical parametric mapping module 215 of FIG. 2 determines whether the reference image and the reconstructed images are significantly different.

At 180, if the answers to such issues are satisfactory (e.g., small p values) and it is determined that the reference image and the reconstructed images are not significantly different, then a "nogo" path 182 is followed and the number of basis functions currently in the solution space are considered adequate and the process ends at 190. If it is determined at 180 that the reference image and the reconstructed images are significantly different, then a "go" path 184 is followed triggering the method to take more basis functions from the null space, move them to the solution space and the entire process steps 120 through 190 of FIG. 1 are repeated until the reference image and the reconstructed are not significantly different.

In one embodiment, the determining of whether the reference image and the reconstructed images are not significantly different is performed by comparing the average reconstructed image with the original image at every pixel and, after the applying of the statistic tests, the resulting difference is considered to be a map/image that honors some conditions of random fields (e.g., Gaussian). Resulting image criteria is applied to see if there are unexpected regions of high or low differences in this map. As an example, what are the chances that a Gaussian random field of a certain size with a given mean (e.g., generally zero) and a known covariance matrix would produce a connected region of 1000 pixels that are all greater than ($>$) 3 standard deviations from the mean. Just as in any hypothesis test, if a probability of this occurring by chance under the Gaussian random field model (i.e., the p-value) is sufficiently low, the hypothesis that the original and mean reconstructed images are the same is rejected, and the number of basis functions in the solution space needs to be increased. Other criteria (tests) applied may include the probability of getting a certain number of discrete regions above/below a threshold (e.g., ten (10) different regions of any size above/below+/−3 sigma), or the probability of getting the observed maximum value in the SPM under the random field model (e.g. the chance there would be 1 pixel being 8 sigmas away from the mean difference.

Via a user interface to the computing system 200 of FIG. 1, a user could interact to define the criteria for determining the quality of the image reconstruction. These would be in the form of thresholds applied to the test statistic map in units of sigma and/or the acceptable p-values to use in rejecting the hypothesis that the original and mean reconstructed images are the same. Alternatively, appropriate values for these could be built into a device (e.g. camera) for optimal compression of images.

Figure 3:
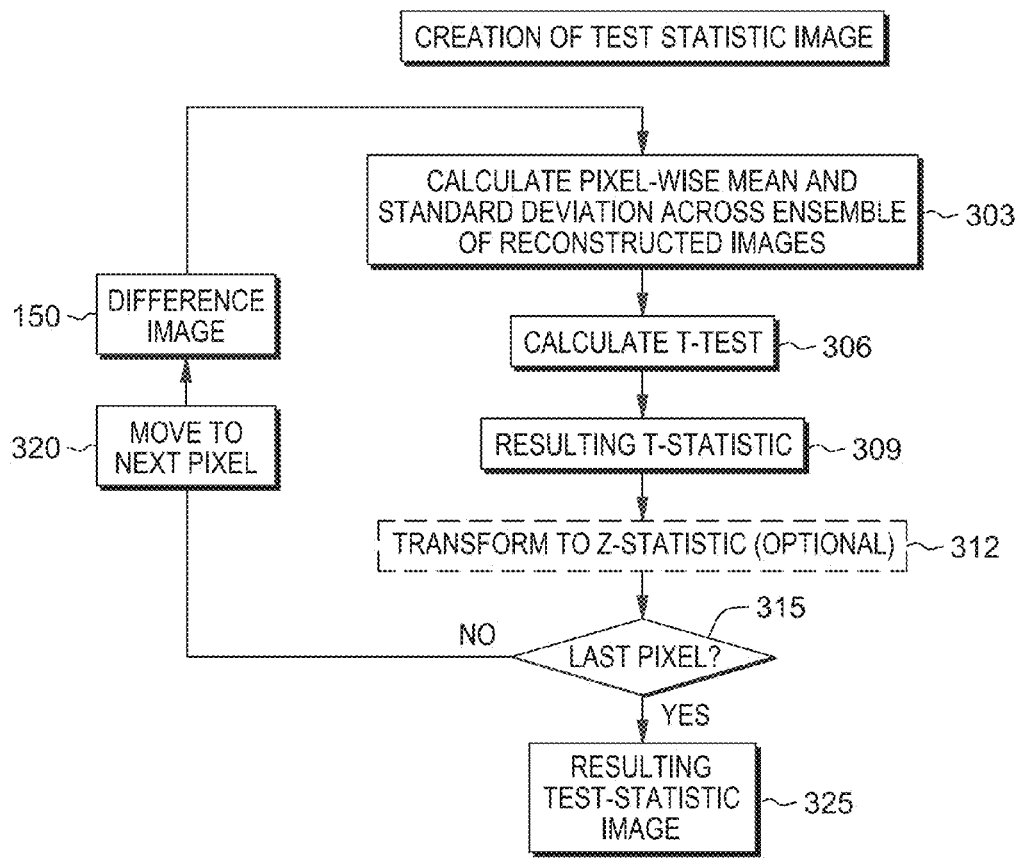
FIG. 3 shows a detailed embodiment of a method run by the statistical test module of FIG. 2 for applying a univariate statistical test at every pixel of the difference image to produce the test statistic image.

FIG. 3 shows a detailed embodiment of a method 300 run by the statistical test module 215 of FIG. 2 for applying a univariate statistical test at every pixel of the difference image 301 to produce the test statistic image. As shown, the method at 303 includes calculating a pixel-wise mean and standard deviation across the ensemble of images reconstructed from the solution space (and some sampling of the null space). The mean and standard deviation for the first (and successive) pixel location is performed at 303. Then, at 306 the process performs a t-test calculation at that pixel location, and obtaining at 309 the resulting t-statistic value. Otherwise, there may be additionally or optionally performed at 312 a transforming of the t-test calculation to a Z-statistic (optional). As known, the t-test and the z-test are both statistical tests of a hypothesis with the t-test based on Student's T-distribution curve while the z-test assumes a normal distribution curve. The Z-statistic is obtained by a statistical transformation using the t-distribution with the inverse of the normal distribution function. The resulting Z-score values is the multiGaussian field.

Then, at 315 a determination is made as to whether the last pixel of the image has been processed. If a t-statistic (or Z-statistic) has been obtained the last pixel, then the method ends and outputs a Test Statistic Image data at 325.

If at 315 at the last pixel has not been processed, then the method proceeds to 320 where the next pixel of the difference image 301 is obtained and the process steps 303-315 repeated until the Test Statistic Image 325 is output. This test statistic image 325 is modeled (transformed) as a stationary multiGaussian random field.

Figure 4:
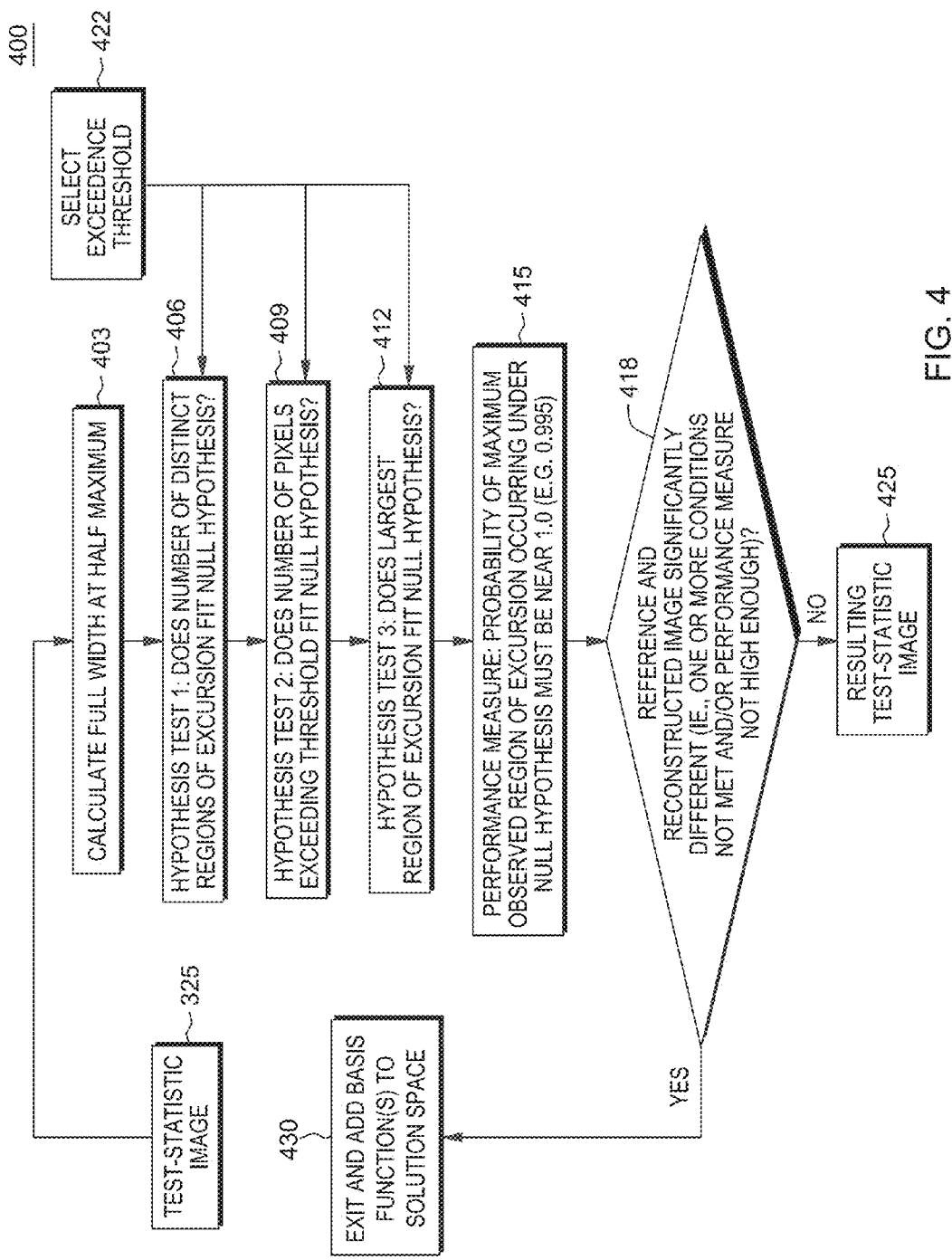
FIG. 4 shows a detailed embodiment of a method for implementing statistical parametric mapping (SPM) techniques to quantify the significance of regions of excursion in the test statistic image through a hypothesis testing framework.

FIG. 4 shows a detailed embodiment of a method 400 run by the statistical parametric mapping module 220 of FIG. 2 for implementing statistical parametric mapping (SPM) techniques to quantify the significance of regions of excursion in the test statistic image through a hypothesis testing framework. The methods enable the number of basis functions used in the image reconstruction are increased until the calculated quantities identify accurate reconstruction.

FIG. 4 depicts null hypothesis testing in which H0 is used to refer to the null hypothesis itself; i.e. the assumption that the two images (the reference and reconstructed images) are statistically similar and hence the reconstruction is accurate. Three tests, H1-H3 are tests that are applied to test the null hypothesis. These are equivalent to Condition 1, 2 and 3 as will be described with respect to the example image reconstruction application depicted in FIGS. 6A-6C. The programming and implementation of these tests are may be provided using basic statistic tests such as routines provided in C, Java or any similar programming languages.

In this embodiment, the test statistic image data is input, along with a truncation or "exceedance" threshold. These inputs are used to test a null hypothesis test is performed to determine degree of accuracy of the reconstructed image.

A first step of the process is to calculate Full Width at Half Maximum (FWHM) at 403 which is the distance between points on the curve at which a function reaches half its maximum value. Under the Gaussian or normal distribution curve, this distance is a function of the standard deviation of the data, and may be computed from the Z-statistic. As known, a FWHM provides an insight into the spatial correlation of a dataset, the spatial correlation defining the roughness or smoothness of a theoretical multiGaussian field. This measure of that correlation defines the character of the multiGaussian (Z) field. A theoretical multiGaussian field with spatial correlation as measured by the FWHM is the null hypothesis, H0.

Thus the method creates a multiGaussian field by comparing the reference and reconstructed image, and creates a theoretical multiGaussian field that is defined the properties of the Gaussian distribution and the spatial correlation (FWHM). The null hypothesis, H0, is that these two fields are the same.

In a first Hypothesis Test 1 at 406, FIG. 4, it is determined whether a number of distinct regions of excursion fit null hypothesis, i.e., the number of discrete regions above/below a threshold. A further hypothesis is tested, i.e., Hypothesis Test 2 at 409 to determine whether the number of pixels exceeding above/below a threshold fit the null hypothesis. A further hypothesis is tested, i.e., Hypothesis Test 3 at 412 to determine whether the largest region of excursion fit null hypothesis, i.e., whether the size of the largest is region above/below a threshold. The expected number of regions, pixels or the size of the largest region are all defined by H0. In each of tests 406, 409 and 412, a user may enter and select the exceedance threshold at 422, and in one example, may be +/−3.0 standard deviations away from the mean.

Continuing further, there is computed a performance measure at 415 which includes applying a confidence level to the statistical tests (i.e. what is the probability of max region of excursion occurring in two images that are similar (i.e. the null hypothesis). In one embodiment, for the test to pass this values must be close to 1.0 or greater than 0.99. For example, at 415, a determination is made as to whether a probability of maximum observed region of excursion occurring under null hypothesis is near 1.0 (e.g. 0.995).

In one embodiment, this performance measure value, along with the exceedance threshold may be set by a user. In a further embodiment, a manufacturer licensee may conduct a broad study with different images and come up with a value that works for their use case and then hard code that value into software/hardware thus removing it as a user-defined parameter.

The process proceeds to 418, where a determination is made as to whether a reference and reconstructed image is significantly different. This includes determining whether one or more conditions for the image reconstruction to be accurate is met, i.e., 1) the total number of regions of excursion; 2) the total number of pixels above an exceedance threshold and 3) the size of the maximum region of excursion) and/or performance measure not high enough).

If all three conditions are met, and/or the performance measure is not high enough, then the system generates the resulting Test-Statistic Image at 425. Otherwise, at 430, the method terminates, and processing proceeds to add a further basis function(s) to the solution space 430 and the process back to processing step 120 FIG. 1 to obtain a new reconstructed image based on the added BF(s).

Figure 6A:
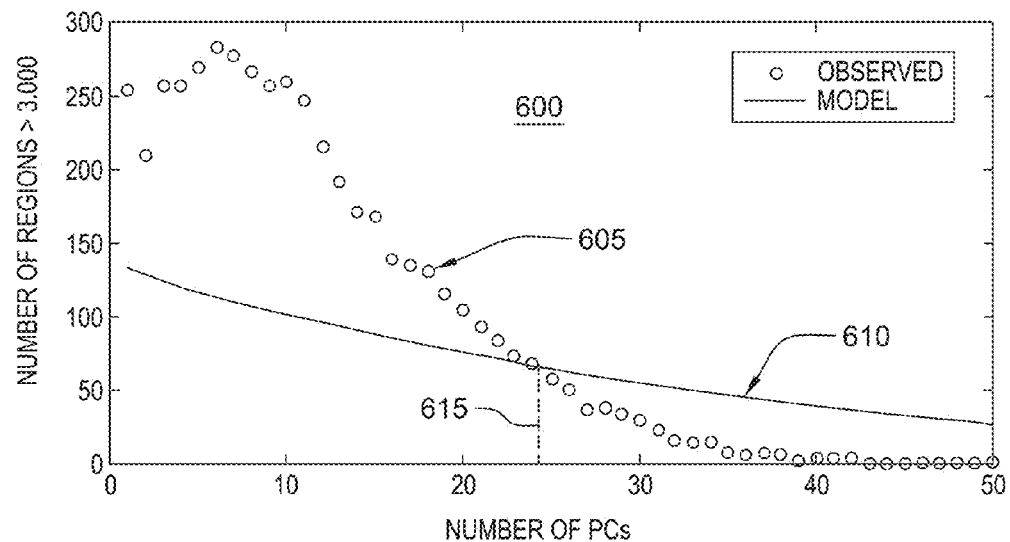
FIG. 6A shows a plot depicting a first condition processing under the null hypothesis plotting a number of excursions exceeding a threshold as a function of the number of basis functions.
Figure 6B:
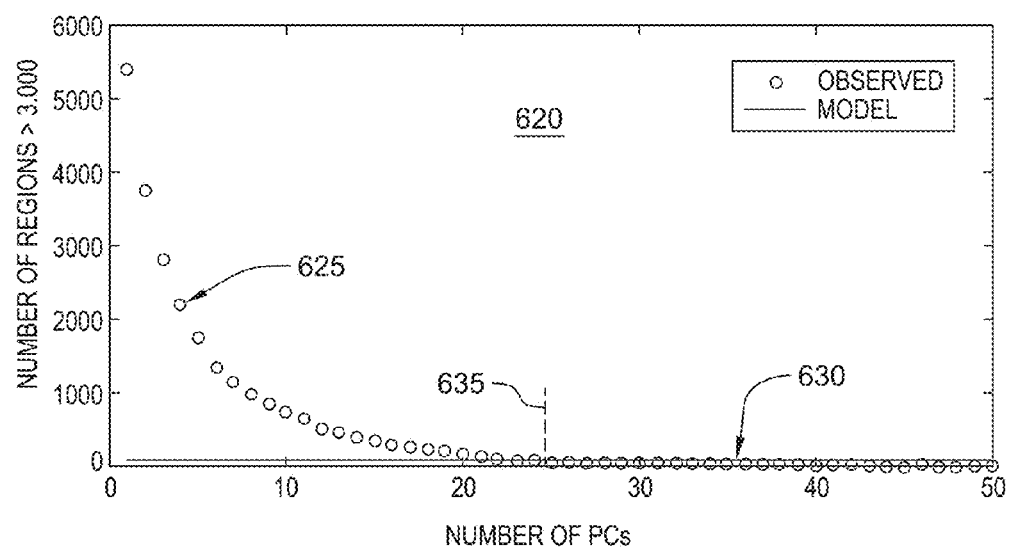
FIG. 6B shows a plot depicting a second condition processing under the null hypothesis showing a number of pixels exceeding a threshold as a function of the number of basis functions.
Figure 6C:
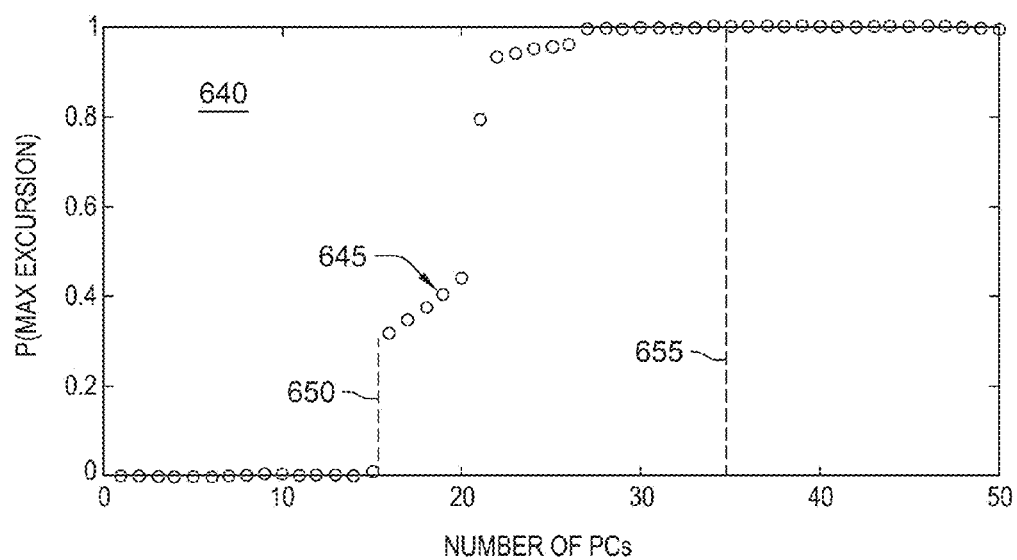
FIG. 6C shows a plot depicting a third condition processing under the null hypothesis showing a probability of a maximum excursion size exceeding a threshold as a function of the number of basis functions.

FIGS. 6A-6C show an example evaluation of the null hypothesis for each of H1 1) the total number of regions of excursion; H2) the total number of pixels above an exceedance threshold and H3) the size of the maximum region of excursion aspects.

Figure 5:
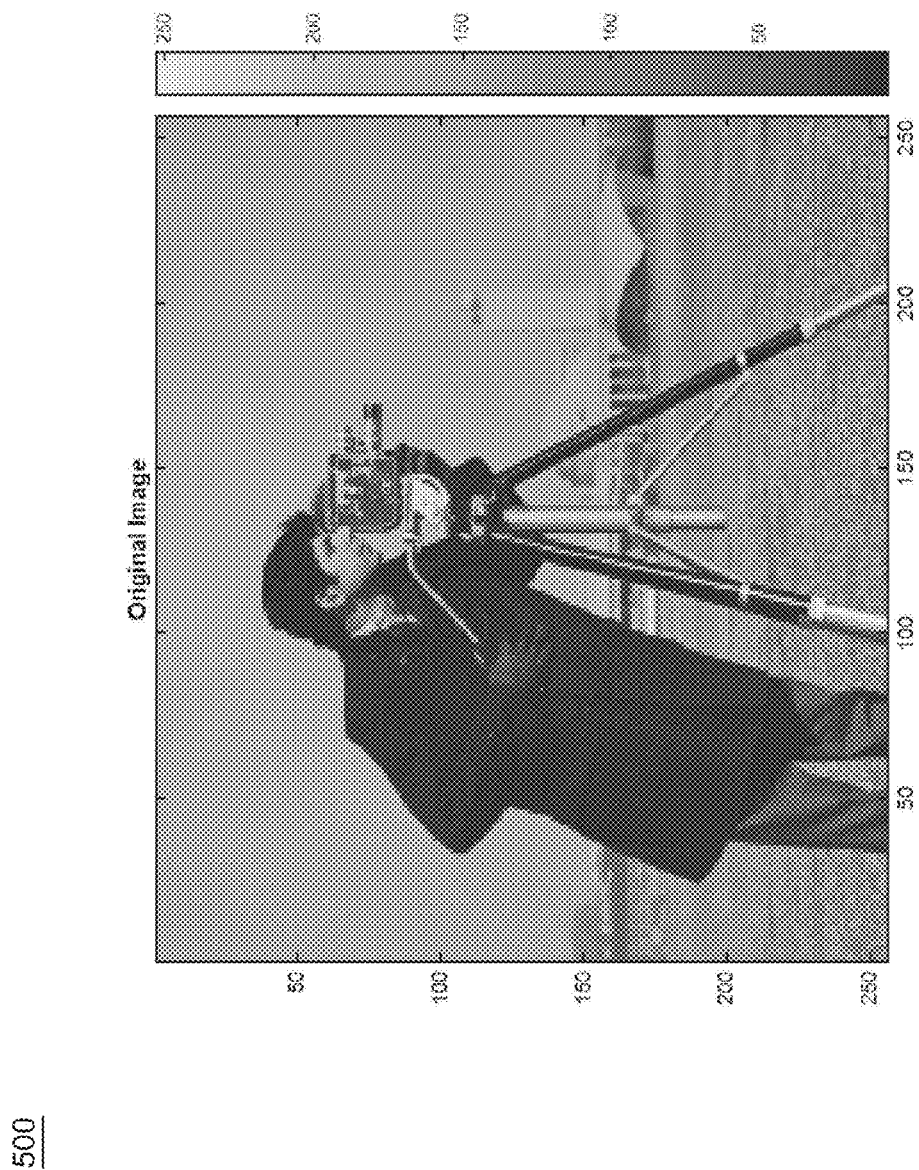
FIG. 5 depicts an example image 500 for demonstrating a reconstruction accuracy in an example embodiment for image reconstruction.

An example of defining image reconstruction accuracy is now described shown with respect to an example image 500 shown in FIG. 5. In one embodiment, an "accurate" reconstruction in SPM Framework may be defined as being maximization of P(max excursion occurrence) given that three conditions (aspects) are met: 1) number of regions of excursion<=an estimated number of excursions (Condition 1); 2) number of pixels of excursion<=an estimated number of pixels (Condition 2); and 3) probability of max excursion occurring is not significant (Condition 3); and that a probability of max excursion occurring is about one (e.g., ~1.0).

Inputs to the system include user-defined inputs including, but not limited to: a number of random samplings of basis function sub-space (e.g., 60 BFs); a value of alpha (e.g., for 1.0-alpha significance level) (e.g., 0.05); and a value representing threshold for truncation of SPM (e.g., +/−3.0 sigma).

FIG. 6A shows a plot 600 illustrating an example result of processing, i.e., determining a satisfaction of the first condition, Condition 1, for the test statistic image. For a given threshold, there is determined a number of regions, i.e., number of excursions, that exceed the given threshold for a test statistic image corresponding to a reconstructed image of example image 500 shown in FIG. 5.

In FIG. 6A, processing at SPM block for the test statistic image, given a threshold, e.g., 3 sigma, the number of regions (of excursion) that exceed this threshold needs to be less than or equal the number under the null hypothesis modeled by curve 610. If the number of excursions of test statistic image exceed the threshold number under the null hypothesis, then the reconstruction is not working. Plot 600 shows a curve 605 relating a measured (observed) number of regions of excursions (below exceedance threshold), i.e., regions of any size or any number of pixels (Y-axis) observed, versus an expected number of regions of excursions modeled as 610, as a function of the number of basis functions, i.e., principle components, PC (on the X-axis) used to produce this reconstructed image. That is, the Y-axis is the number of regions exceeding, e.g., +/−3 Sigma and the X-axis is a number of principle components (basis functions).

As shown in the example plot 600, for the Condition 1, given an example selected SPM threshold of +/−3 sigma, given the estimated number of distinct regions of excursions under null hypothesis model (H0) as 65, for example, there would be needed a number of PCs>=24 (basis functions) as shown at 615 for Condition 1 to be met and be a viable reconstruction.

FIG. 6B shows an example result of processing for determining a satisfaction of the second condition, Condition 2, for the test statistic image. For a given sigma threshold, there is determined a number of pixels that exceed the given threshold for a test statistic image corresponding to a reconstructed image of example image 500 shown in FIG. 5.

In FIG. 6B, processing at SPM block for the test statistic image, given a threshold, e.g., 3 sigma, the number of pixels that exceed this threshold needs to be less than or equal the number under the null hypothesis modeled by curve 630. If the number of pixels of test statistic image exceed the threshold number under the null hypothesis, then the reconstruction is not working. Plot 620 shows a curve 625 relating a measured (observed) number of pixels (Y-axis) observed, versus an expected number of pixels modeled as 630, as a function of the number of basis functions i.e., principle components, PC (on the X-axis) used to produce this reconstructed image. That is, the Y-axis is the number of regions exceeding, e.g., +/−3 Sigma and the X-axis is a number of principle components (basis functions).

As shown in the example plot 620, for the Condition 2, given an example selected SPM exceedance threshold of +/−3 sigma, and given the estimated number of pixels under null hypothesis model (H0) as 89, for example, there would be needed a number of PCs>=24 (basis functions) as shown at 635 for Condition 2 to be met and be a viable reconstruction.

FIG. 6C shows an example plot 640 showing a result of processing for determining a satisfaction of the third condition, Condition 3, for the test statistic image, which determines the number of basis functions required (X-axis) such that the size of the maximum excursion (e.g., a spatially connected region) under the SPM model is not significant under the null hypothesis, e.g., is under a user specified threshold (alpha value), e.g., a probability value of 0.05. That is, there is determined whether a maximum excursion size under the SPM model is not significant, i.e. is greater than given alpha threshold (e.g., 0.05) for a test statistic image corresponding to a reconstructed image of example image 500 shown in FIG. 5.

In FIG. 6C, a plot 640 shows a curve 645 relating a probability of a maximum excursion (biggest one over the threshold) size (Y-axis) as a function of the number of basis functions i.e., principle components (on the X-axis) used to produce this reconstructed image. Here, to meet Condition 3, the probability of a size of the maximum excursion under the SPM model cannot be significant (i.e., cannot be less than an alpha set at 0.05). Thus as shown, a reconstruction of an image using>=16 PCs demonstrate a resulting P (max excursion size>0.05) as shown at 650 for Condition 3 to be met and be a viable reconstruction (i.e., there is no longer a significant excursion).

As mentioned herein above with respect to FIG. 4, there is computed a performance measure which includes applying a confidence level to the statistical tests e.g., determining what is the probability of a maximum size region of excursion occurring in two images that are similar (i.e. the null hypothesis). In one embodiment, for the test to pass this value must be close to 1.0 or greater than 0.99. Thus, to obtain performance measure value, for example, a determination is made as to whether the probability of maximum observed region of excursion occurring under null hypothesis is near 1.0 (e.g. 0.995). Referring to FIG. 6C, it is shown that at 655, the probability of the maximum observed excursion size occurring under H0 being about ~1.0 for reconstructions is met for an image reconstructed from using about >=34 PC's (basis functions).

Figure 7:
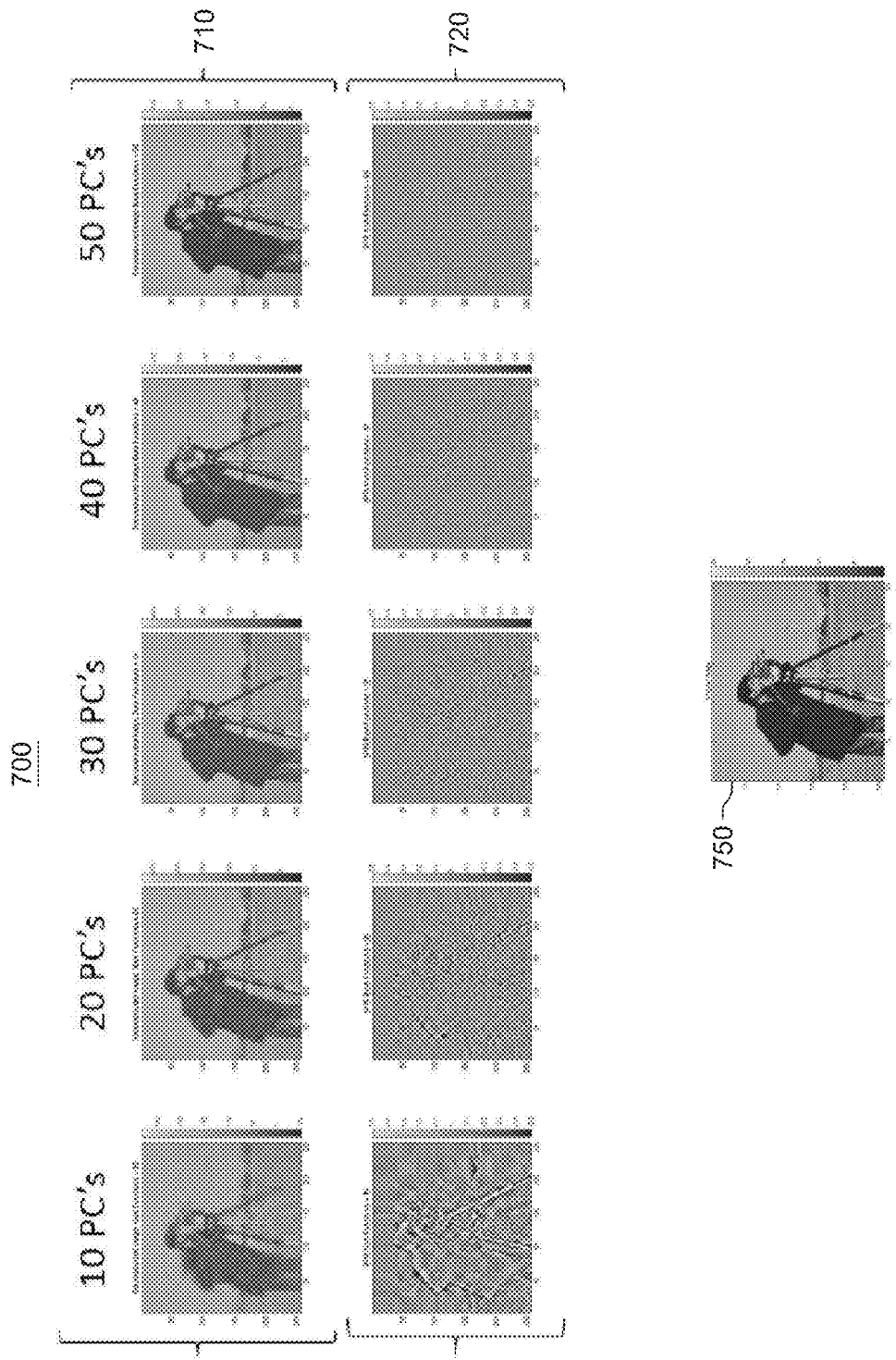
FIG. 7 shows example results of image decomposition, reconstruction and SPM results for the image of FIG. 5.
Figure 8:
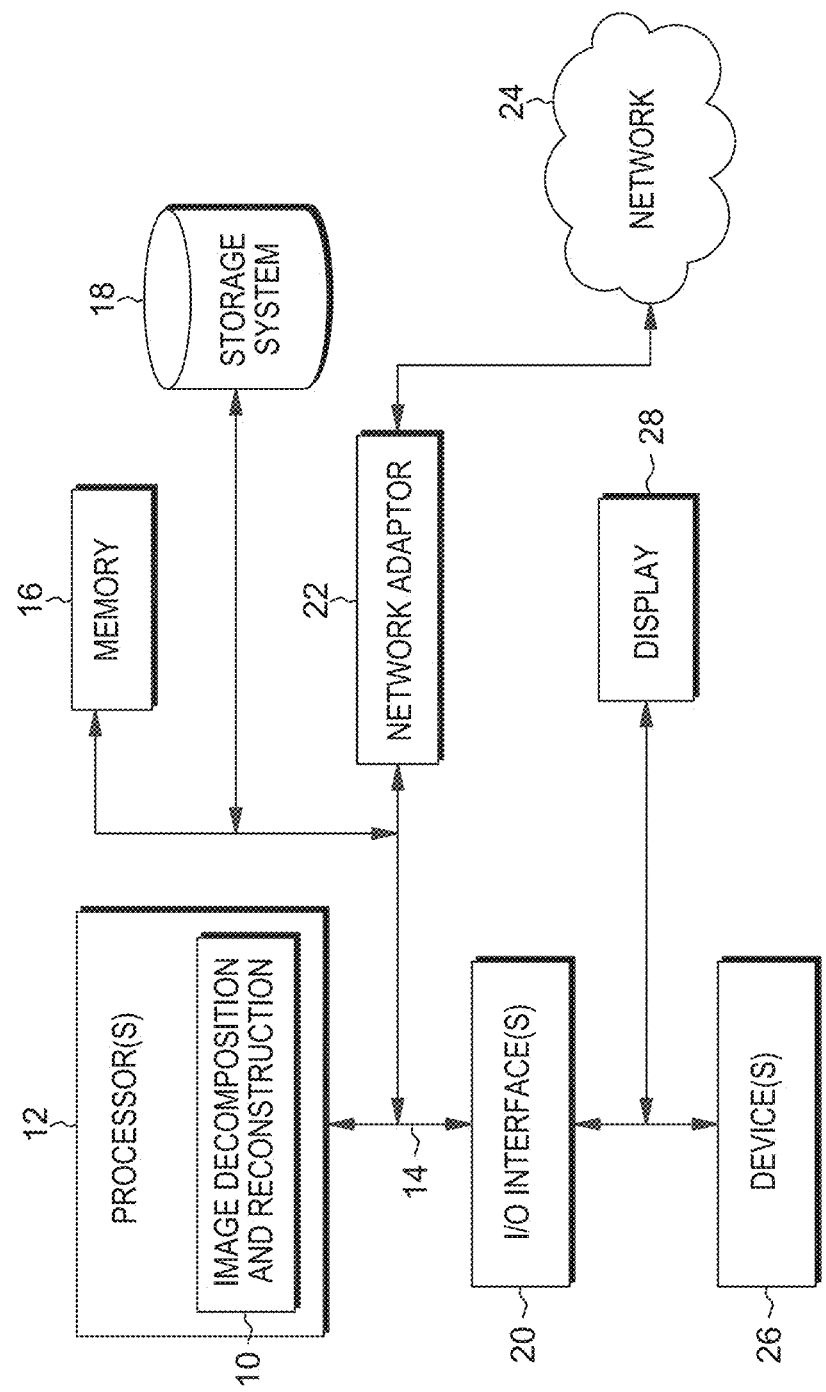
FIG. 8 illustrates a schematic of an example computer or processing system of FIG. 2 for implementing the methods depicted in FIG. 1.

For the example reconstruction of example image 500 of FIG. 5, FIG. 7 shows example reconstructed images 710 for each of differing amounts of basis functions (PCs) indicated (e.g., reconstructed from use of 10 BFs to 50 BFs). FIG. 7 also depicts for the example reconstructed images 710 for each of differing amounts of basis functions (PCs) indicated, there corresponding example SPM's 720 computed for each of differing amounts of basis functions (PCs) indicated. Using the 34 basis functions according to the example processing results and the calculated performance measure of FIGS. 6A-6C, a reconstructed image 750 is shown having the required reconstruction quality.

Thus, the present disclosure enables a quantifiable means of determining the accuracy of a reconstructed image relative to a reference image. These differences are used to determine the minimal necessary number of principal components to accurately reconstruct the image. The existence of statistically significant regions of excursion in the difference image (reconstructed−reference) are quantified by statistical parametric mapping techniques (SPM). The difference image is used as input to a univariate statistical test at every pixel to calculate an image of the test statistic which is then modeled as a multiGaussian random field. Three quantities are calculated from the test statistic image: 1) a maximum test statistic value; 2) a Number of regions of excursion; and 3) a Number of pixels within the regions of excursion and these are compared to values expected in a stationary multiGaussian field. One or more of these three measures is used to determine whether or not the reconstructed image is an accurate representation of the reference image. If not, the number of principal components used in the reconstruction is increased.

In one embodiment, the system and methods can be used for purposes of sensor de-noising. In such an application, high frequency radar is used extensively in operational oceanography applications to monitor flow currents. Returns from the sensor consist of the velocity of flow, in addition to some unknown, spatially varying, uncertainty component. Principal component analysis of the observations extract those features associated with dominant flow features. Selection of number of PC's to include is complex and largely heuristic. This cutoff number can be identified through SPM between original, reference, flow map and reconstructed data in an iterative manner permitting an automated de-noising of sensor data. Location and intensity of statistical excursions can also be computed.

In a further embodiment, the system and methods can be used for purposes of image reconstruction as described herein. Image reconstruction has a broad range of applications across diverse number of industries encompassing image enhancement, pattern recognition and feature reconstruction. Discrete wavelet transform (DFT) yields a set of discrete wavelet functions that are used in conducting image reconstruction. A critical point is the selection of number of basis functions to optimally represent the actual image while minimizing noise that may impact the comparison. The method described herein can be used for guiding the optimal reconstruction of the image for subsequent analysis or for compression in still or video image storage.

As a further advantage, the methods described herewith can be used in applications such as pattern recognition software, feature extraction, blind source separation, anomaly detection, sensor processing and Image and Video Compression.

As a further advantage, the methods described herewith depict a self-contained process, i.e., no additional information beyond reference image dataset and parameters of reconstruction and testing—that employs randomization of null-space in determination of reconstruction quality is needed.

FIG. 10 illustrates a schematic of an example computer or processing system that may implement the method to determine accuracy of a reconstructed images in one embodiment of the present disclosure and to determine the minimal necessary number of principal components (basis functions) to accurately reconstruct the image. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the image decomposition, reconstruction and statistical methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for determining an accuracy of a reconstructed dataset relative to a reference dataset comprising:
    decomposing, by a processor device, a reference dataset into a plurality of orthogonal basis functions;
    reconstructing a dataset using said plurality of orthogonal basis functions;
    determining differences between the reference dataset and reconstructed dataset,
    using statistical parametric mapping (SPM) to quantify, at said processor device, existence of statistically significant regions of excursion in the determined differences between the reference dataset and reconstructed dataset;
    determining, based on said quantified statistically significant regions of excursion, a minimum number of orthogonal basis functions to reconstruct the dataset with a specified degree of accuracy; and
    storing said minimum number of orthogonal basis functions as representative of said reference dataset.

2. The computer-implemented method of claim 1, further comprising:
    generating multiple reconstructed datasets from the minimum number of orthogonal basis functions forming a solution space; and
    randomly selecting lesser basis functions from a null space.

3. The computer-implemented method of claim 2, wherein said reference dataset comprise pixel data of an image, said reconstructed dataset being a reconstruction of said reference image based on said minimum number of orthogonal basis functions.

4. The computer-implemented method of claim 1, wherein said reference dataset comprise a sensor output data, said reconstructed dataset being a reconstruction of said sensor output data based on said minimum number of orthogonal basis functions, wherein said reconstructed sensor data has a noise content removed.

5. The computer-implemented method of claim 2, further comprising:
    subjecting said determined differences between the reference dataset pixels and pixels of a reconstructed dataset to a univariate statistical test at every pixel location to generate an image of the test statistic;
    modeling said test statistic image as a multiGaussian random field;
    calculating quantities from the test statistic image, the quantities comprising one or more of: a maximum test statistic value, a number of regions of excursion, and a number of pixels within the regions of excursion; and
    comparing these one or more quantities from the test statistic image to values expected in a stationary multiGaussian field.

6. The computer-implemented method of claim 5, further comprising:
    determining, based on the comparing, whether or not the reconstructed image is an accurate representation of the reference image; and
    if determined that the reconstructed image is not an accurate representation of the reference image, increasing the number of orthogonal basis functions used in the reconstructing.

7. The computer-implemented method of claim 5, wherein said statistical parametric mapping (SPM) techniques are used to quantify the significance of regions of excursion in the test statistic image through a hypothesis testing framework.

8. The computer-implemented method of claim 7, further comprising:
    using a stopping rule for said statistical parametric mapping (SPM) to determine when enough orthogonal basis functions have been used.

9. A computer system for determining an accuracy of a reconstructed dataset relative to a reference dataset, the system comprising:
    a memory storage device for storing datasets;
    a processor device in communication with said memory storage device, said processor device configured to:
        decompose a reference dataset into a plurality of orthogonal basis functions;
        reconstruct a dataset using said plurality of orthogonal basis functions;
        determine differences between the reference dataset and reconstructed dataset;
        use statistical parametric mapping (SPM) to quantify existence of statistically significant regions of excursion in the determined differences between the reference dataset and reconstructed dataset;
        determine, based on said quantified statistically significant regions of excursion, a minimum number of orthogonal basis functions to reconstruct the dataset with a specified degree of accuracy; and
        store, in the memory storage device, the minimum number of orthogonal basis functions as representative of said reference dataset.

10. The computer system of claim 9, wherein said processor device is further configured to:
    generate multiple reconstructed datasets from the minimum number of orthogonal basis functions forming a solution space; and
    randomly select lesser basis functions from a null space.

11. The computer system of claim 10, wherein said reference dataset comprise pixel data of an image, said reconstructed dataset being a reconstruction of said reference image based on said minimum number of orthogonal basis functions.

12. The computer system of claim 10, wherein said reference dataset comprise a sensor output data, said reconstructed dataset being a reconstruction of said sensor output data based on said minimum number of orthogonal basis functions, wherein said reconstructed sensor data has a noise content removed.

13. The computer system of claim 10, wherein said processor device is further configured to:
    subject said determined differences between the reference dataset pixels and pixels of a reconstructed dataset to a univariate statistical test at every pixel location to generate an image of the test statistic;
    model said test statistic image as a multiGaussian random field;
    calculate quantities from the test statistic image, the quantities comprising one or more of: a maximum test statistic value, a number of regions of excursion, and a number of pixels within the regions of excursion; and compare these one or more quantities from the test statistic image to values expected in a stationary multiGaussian field.

14. The computer system of claim 13, wherein said processor device is further configured to:

determine, based on the comparing, whether or not the reconstructed image is an accurate representation of the reference image; and if determined that the reconstructed image is not an accurate representation of the reference image, increase the number of orthogonal basis functions used in the reconstructing.

15. The computer system of claim 13, wherein said statistical parametric mapping (SPM) techniques are used to quantify the significance of regions of excursion in the test statistic image through a hypothesis testing framework.

16. The computer system of claim 15, further comprising:

using a stopping rule for said statistical parametric mapping (SPM) to determine when enough orthogonal basis functions have been used.

17. A computer program product comprising:

a non-transitory computer readable media embodying a program of instructions executable by a processing unit for determining an accuracy of a reconstructed dataset relative to a reference dataset, the program of instructions, when executing, performing the following steps:

decomposing a reference dataset into a plurality of orthogonal basis functions;

reconstructing a dataset using said plurality of orthogonal basis functions;

determining differences between the reference dataset and reconstructed dataset;

using statistical parametric mapping (SPM) to quantify, at said processor device, existence of statistically significant regions of excursion in the determined differences between the reference dataset and reconstructed dataset;

determining, based on said quantified statistically significant regions of excursion, a minimum number of orthogonal basis functions to reconstruct the dataset with a specified degree of accuracy; and storing said minimum number of orthogonal basis functions as representative of said reference dataset.

18. The computer program product of claim 17, wherein said method steps further comprise:

generating multiple reconstructed datasets from the minimum number of orthogonal basis functions forming a solution space; and randomly selecting lesser basis functions from a null space.

19. The computer program product of claim 18, wherein said reference dataset comprises pixel data of an image, said reconstructed dataset being a reconstruction of said reference image based on said minimum number of orthogonal basis functions.

20. The computer program product of claim 18, wherein said method steps further comprise:

subjecting said determined differences between the reference dataset pixels and pixels of a reconstructed dataset to a univariate statistical test at every pixel location to generate an image of the test statistic;

modeling said test statistic image as a multiGaussian random field;

calculating quantities from the test statistic image, the quantities comprising one or more of: a maximum test statistic value, a number of regions of excursion, and a number of pixels within the regions of excursion; and comparing these one or more quantities from the test statistic image to values expected in a stationary multiGaussian field.

21. The computer program product of claim 20, further comprising:

determining, based on the comparing, whether or not the reconstructed image is an accurate representation of the reference image; and if determined that the reconstructed image is not an accurate representation of the reference image, increasing the number of orthogonal basis functions used in the reconstructing.

* * * * *